Patented May 14, 1946

2,400,143

UNITED STATES PATENT OFFICE 2,400,143

PROCESSES OF FERMENTATION

Selman A. Waksman, Highland Park, N. J., assignor to Merck & Co., Inc., Rahway, N. J., a corporation of New Jersey No Drawing. Application May 8, 1943, Serial No. 486,248

11 Claims. (Cl. 195—36)

This invention relates to a process for the production of citric acid, and particularly to a surface process for such production by fermentation.

It has been known, since Wehmer's work in 1892 on the *Citromyces* group of fungi, and since Zahorski's work in 1913 and Currie's later work on the *Aspergillus niger* group, that some fungi or molds are capable of producing citric acid from sugar and sugar-containing materials. However, the citric acid which has been so produced has been commonly accompanied by the production of other acids, such as oxalic and gluconic.

The objects of this invention concern the use of a fungal organism, which has not been previously recognized as a producer of citric acid, under suitable conditions of nutrition and by procedures which result in the production of citric acid in high yield, to the substantial exclusion of other acids.

These and other objects will be apparent and a fuller understanding of this invention will be had by reference to the following description and claims.

The organism employed in this invention is *Aspergillus wentii*, which belongs to the group of yellow to brown molds. It is characterized by certain well defined morphological features, which distinguish it from other molds, especially those belonging to the *Aspergillus niger* or black group of molds, as is clear from the comparative descriptions which are given of these two groups in "The Aspergilli," by Thom and Church (Williams & Wilkins Co., Baltimore, Md., 1926).

The process herein which the applicant has developed for the production of citric acid by *Aspergillus wentii* advantageously comprises a growth phase and a fermentation phase.

For growth, a medium is provided which is favorable for the rapid and the extensive growth of the fungal organism, *A. wentii*. It has been found that this medium must have certain properties such as those afforded by the supply of a good source of energy (sucrose, dextrose, the sugars of molasses, as instances), a source of nitrogen (for examples, ammonium sulfate, sodium nitrate, ammonium nitrate, urea, or peptone), and certain minerals comprising those essential to the growth of the organism (especially, phosphate, sulfate, calcium, magnesium, potassium, iron and zinc).

In connection with the provision of the growth elements, the iron and zinc are presented in such a balanced concentration as to favor growth but to retard sporulation of the fungus. Such effects are realized by keeping down the iron concentration to a minimum necessary for growth and by maintaining the zinc concentration at a maximum tolerable by the fungus, as indicated in the culture medium formula below, which illustrates such a balance.

Thus, a typical culture medium which is favorable for the surface aerobic growth of *Aspergillus wentii* is one composed of:

| | | |
|---|---|---|
| Cane sugar | grams | 150 |
| Ammonium nitrate | grams | 3 |
| Peptone | gram | 0.5 |
| Magnesium sulfate ($MgSO_4.7H_2O$) | gram | 1.0 |
| Dipotassium hydrogen phosphate ($K_2HPO_4$) | gram | 0.5 |
| Potassium chloride | gram | 0.5 |
| Zinc sulfate ($ZnSO_4.7H_2O$) | gram | 0.3 |
| Ferric chloride ($FeCl_3.6H_2O$) | gram | 0.03 |
| Calcium chloride | gram | 0.1 |
| Distilled water to make | c. c. | 1000 |

It has been found that the best results are attained when the culture medium is adjusted to about pH 2.0.

The concentrations of the constituents of this medium are not absolute; considerable variation still affords favorable results. For instance, the cane sugar content may vary from about 10 per cent to about 20 per cent, or molasses may be utilized to provide about 10 per cent to about 20 per cent of total carbohydrates required for the growth of the fungus and the production of citric acid.

This culture medium is sterilized by heat and is then inoculated with an aqueous suspension of spores of *Aspergillus wentii* which has been grown upon an appropriate solid or liquid medium adapted for extensive spore production, such as a nutrient agar medium comprising, as a typical example:

| | Grams |
|---|---|
| Peptone | 5 |
| Glucose | 10 |
| Dipotassium hydrogen phosphate ($K_2HPO_4$) | 0.5 |
| Magnesium sulfate ($MgSO_4.7H_2O$) | 0.5 |
| Agar | 15 |
| Water to make | 1000 |

As a saying in time, the spores of this fungus may be pregerminated in a water suspension or in a dilute solution of this nutrient agar medium, for about 24 hours, at about 25° to 32° C. This pregermination procedure can be carried out in small sterile flasks or other sterile containers.

The process may be illustrated by the following example, though it is to be understood that this example is given in illustration and not in limitation:

Large shallow vessels containing the described culture medium, which has been inoculated with the suspension of spores or with the pregerminated spores of *A. wentii*, are now placed in an incubating chamber at about 25° to 32° C. This range of temperature is favorable for the growth of the fungus. Within about 3 days, a good surface pellicle of the fungus, white in color and almost free from brown spores, is obtained. The period of growth depends upon the temperature and the composition of the culture medium. Such period may be completed in 2 or 3 days, or it may need to be extended to 4 or 5 days.

The described growth phase thus results in the production of a firm, well-developed pellicle of *A. wentii*. An appreciable amount of citric acid is also produced during this period. However, the more active production of citric acid occurs during the subsequent fermentation.

After that pellicle has been obtained, the residual culture medium is drawn off and is then available for the recovery of citric acid therefrom by known methods.

The main fermentation is now begun by replacing the drawn-off residual culture medium by a solution containing from about 15 per cent to 20 per cent of total carbohydrate or carbohydrates, such as sucrose, maltose, lactose, glucose or dextrose, levulose, invert sugar, or the sugars contained in molasses, or mixtures of these carbohydrates.

During this main fermentation the temperature of the carbohydrate solution, which has been introduced below the formed fungus pellicle, is maintained at about the range of that which prevailed during the growth phase, i. e., about 25° to 32° C. The formation of citric acid begins to take place immediately.

In order to prevent an undue accumulation of free citric acid in the shallow vessels, the prevalence of which would tend to interfere with the activity of the mycelium, the fermenting liquid is neutralized from time to time by the addition of a sufficient quantity of powdered calcium carbonate. An excess of calcium carbonate in the vessels is undesirable; the amount of calcium carbonate added should be sufficient to neutralize excess acidity without raising the pH of the medium above 3.0.

It has been found by the applicant that even an alkali-metal hydroxide, such as caustic soda or caustic potash, can be used as a neutralizing agent in this process, provided that it is used under carefully controlled conditions. This is surprising, since the use of an alkali-metal hydroxide ordinarily induces the formation of oxalic acid. It is therefore necessary to add the alkali-metal hydroxide solution, for example, a normal solution of sodium hydroxide or potassium hydroxide, every few hours, or in a slow continuous stream, so that the pH value of the fermenting liquid is adjusted to not more than 3.0, preferably from 2.0 to 3.0, to avoid an excess of such alkali. If this addition of alkali-metal hydroxide solution is made by the stirring of the latter below the pellicle or fungus pad, the pH value is kept not in excess of 3.0, with the results that any tendency to the formation of oxalic acid is substantially suppressed and the injurious effect upon the mycelium of a large accumulation of free citric acid in the shallow vessels is avoided.

In view of the fact that the production of citric acid involves an aerobic process, it is essential either that the solution or the dispersion of carbohydrate should be very shallow, that is, about 1 to 3 inches in depth, or that, where deeper vessels are used, air either should be pumped under pressure into the fermenting liquid below the fungus pellicle or should be supplied above the growth of the fungus, until the completion of the process.

During this fermentation phase, active citric acid formation occurs, with a yield of about 30 to 60 per cent, substantially corresponding to the amount of carbohydrate or carbohydrates and the kind or kinds thereof used. The citric acid is obtained from its resulting salt by known methods.

The references herein to "dextrose," "glucose," "levulose," "invert sugar," "sugars of molasses," "sugars contained in molasses," "sucrose," "cane sugar," "maltose," "lactose," "carbohydrate," and "carbohydrates," are intended to include all monosaccharides, disaccharides, or mixtures thereof. Any mixtures of monosaccharides, disaccharides and/or starches can also be used. Starch or starches, as well as dextrins, without monosaccharide or without disaccharide, can be utilized. When starch is used due regard must be had to the viscosity of a starchy dispersion. In this latter respect, the practical limit of starch concentration has been found to be about 5 per cent, preferably about 3 per cent. Inulin may also be employed in these processes, in a manner similar to that of the use of starch.

When molasses is used in the described process, careful prior purification of the molasses is not essential, though some purification of some grades of molasses is advantageous by way of diminishing their content of mineral and some nitrogen compounds which, when excessive, may adversely affect the yield of citric acid.

The foregoing examples have been given by way of illustration, and not of limitation, as it is obvious that certain modifications may be made in the composition of the culture medium and in the kinds and proportions of the materials employed, and in the steps of the fermentation process, without departing from the spirit and the scope of the invention and the purview of the claims.

I claim:

1. Process for the production of a member selected from the group consisting of citric acid and its salts, comprising the fermentation of an aqueous carbohydrate substrate containing nutrient inorganic and nitrogen-containing materials by means of a surface aerobic growth of *Aspergillus wentii*, in the presence of iron and zinc salts.

2. Process for the production of a member selected from the group consisting of citric acid and its salts which comprises inoculating a medium containing a carbohydrate and nutrient inorganic and nitrogen-containing materials with *Aspergillus wentii*, in the presence of iron and zinc salts, then aerating the medium so as to permit surface aerobic growth of the said fungus and to promote fermentation, and adding a neutralizing agent during the course of the fermentation to control acidity.

3. Process for the production of a member selected from the group consisting of citric acid and its salts by means of a surface aerobic growth of *Aspergillus wentii*, which comprises the steps of sterilizing a culture medium containing nutrient inorganic and nitrogen-containing materials and carbohydrates, inoculating the said medium with *Aspergillus wentii*, developing mycelial growth in the presence of iron and zinc at a temperature range of approximately 25° to 32° C., under free access of air, removing the residual nutrient culture medium, supplying the developed mycelium with a solution of carbohydrate, adding a neutralizing agent to control acidity, and conducting the fermentation at about 25° to 32° C. under free access of air to substantial completion.

4. In a process for producing citric acid by the fermentative action of a surface aerobic growth of Aspergillus wentii, the step of promoting the mycelial growth of the said fungus by growing the spores of the said fungus in a medium comprising nutrient inorganic and nitrogen-containing materials, salts of iron and zinc, and carbohydrate.

5. In a process for producing citric acid by means of a surface aerobic growth of Aspergillus wentii, involving the operations of preparing a culture solution containing nutrient inorganic and nitrogen-containing materials, and carbohydrate, and inoculating such solution with the said fungus, the step which consists in adding to the said culture solution soluble salts of iron and zinc in substantially the concentrations represented by 0.03 gram of crystalline ferric chloride ($FeCl_3.6H_2O$) and 0.3 gram of crystalline zinc sulfate ($ZnSO_4.7H_2O$) per litre of the said culture solution, whereby a balanced ratio of iron and zinc salts is attained, and whereby the growth of the fungus is favored and the sporulation of the fungus is retarded.

6. In a process for producing citric acid by means of a surface aerobic growth of Aspergillus wentii, involving the operations of preparing a culture solution containing nutrient inorganic and nitrogen-containing materials, iron, zinc, and carbohydrate, and inoculating such solution with the said fungus, the step which consists in adding to the fermenting liquid a solution of an alkali-metal hydroxide in sufficient quantity to maintain the pH of the fermenting liquid at a value of not more than 3.0, whereby the formation of oxalic acid is substantially avoided.

7. Process for the production of citric acid, comprising the fermentation by means of a surface aerobic growth of Aspergillus wentii of an aqueous substrate containing per litre:

| | Grams, about— |
|---|---|
| Carbohydrate | 30 to 200 |
| Ammonium nitrate | 3 |
| Peptone | 0.5 |
| Magnesium sulfate ($MgSO_4.7H_2O$) | 1.0 |
| Dipotassium hydrogen phosphate ($K_2HPO_4$) | 0.5 |
| Potassium chloride | 0.5 |
| Zinc sulfate ($ZnSO_4.7H_2O$) | 0.3 |
| Ferric chloride ($FeCl_3.6H_2O$) | 0.03 |
| Calcium chloride | 0.1 | the said substrate being adjusted to a pH value of about 2.0.

8. Process for the production of citric acid, comprising the fermentation, by means of a surface aerobic growth of Aspergillus wentii, of an aqueous substrate containing a carbohydrate, ammonium nitrate, peptone, magnesium sulfate, dipotassium hydrogen phosphate, potassium chloride, zinc sulfate, ferric chloride, and calcium chloride.

9. Process for the production of a member selected from the group consisting of citric acid and its salts, comprising the fermentation of an aqueous carbohydrate substrate containing nutrient inorganic and nitrogen-containing materials by means of a surface aerobic growth of Aspergillus wentii in the presence of iron and zinc salts, removing the residual medium after the development of a pellicle, supplying a carbohydrate solution to the thus developed pellicle, and conducting further surface aerobic fermentation by means of the said pellicle.

10. Process for the production of a member selected from the group consisting of citric acid and its salts by means of a surface aerobic growth of Aspergillus wentii, which comprises the steps of inoculating a solution containing nutrient inorganic and nitrogen-containing materials and about 10 per cent to 20 per cent of total carbohydrate with a suspension of pregerminated spores of the said fungus, the said nutrient inorganic and nitrogen-containing materials comprising compounds of nitrogen, phosphorus, sulfur, calcium, potassium, magnesium, iron and zinc, conducting the growth of said fungus at a temperature range of about 25° to 32° C. for about 2 to 5 days, in the presence of an abundant air supply, for the production of a pellicle, then removing the residual culture solution and replacing it by a solution containing about 3 per cent to 20 per cent of total carbohydrate, adding to that solution of carbohydrate a neutralizing agent to maintain a pH value not in excess of 3.0 during the fermentation, and conducting the fermentation at a temperature range of about 25° to 32° C. to substantial completion, in the presence of an abundant air supply.

11. Process for the production of a member selected from the group consisting of citric acid and its salts by means of a surface aerobic growth of Aspergillus wentii, which comprises the steps of inoculating a solution containing nutrient inorganic and nitrogen-containing materials and about 10 per cent to 20 per cent of total carbohydrate with a suspension of pregerminated spores of the said fungus, the said nutrient inorganic and nitrogen-containing materials comprising compounds of nitrogen, phosphorus, sulfur, calcium, potassium, magnesium, iron and zinc, conducting the growth of the said fungus at a temperature range of about 25° to 32° C. for about 2 to 5 days, for the production of a pellicle, then removing the residual culture solution and replacing it by a solution containing about 3 per cent to 20 per cent of total carbohydrate, adding to that solution of carbohydrate a neutralizing agent to maintain a pH value not in excess of 3.0 during the fermentation, meanwhile supplying air under pressure into the substrate, and conducting the fermentation at a temperature range of about 25° to 32° C. to substantial completion.

SELMAN A. WAKSMAN.